United States Patent [19]

Zeltner et al.

[11] Patent Number: 4,853,600

[45] Date of Patent: Aug. 1, 1989

[54] FLASH APPARATUS WITH COLOR TEMPERATURE CONTROL

[76] Inventors: Urs Zeltner, Dammstrasse 408, CH-4118 Rodersdorf; Hans P. Hauser, Tulpenweg 9, CH-4310 Rheinfelden, both of Switzerland

[21] Appl. No.: 37,722

[22] Filed: Apr. 13, 1987

[30] Foreign Application Priority Data

Apr. 11, 1986 [DE] Fed. Rep. of Germany ....... 3612164

[51] Int. Cl.[4] ...................... H05B 41/32; F21V 23/00; G03B 15/05

[52] U.S. Cl. ................................ 315/241 P; 315/151; 315/152; 315/155; 315/239; 354/132

[58] Field of Search ............ 315/241 R, 241 P, 241 S, 315/291, 293, 151, 152, 155; 354/132, 145.1

[56] References Cited

U.S. PATENT DOCUMENTS

| | | | |
|---|---|---|---|
| 3,707,649 | 12/1972 | Kottenstette | 315/239 |
| 4,272,704 | 6/1981 | Alexander | 315/205 |
| 4,415,247 | 11/1983 | Takematsu | 315/241 P |
| 4,453,110 | 6/1983 | Iwamoto et al. | 315/241 P |
| 4,485,336 | 11/1984 | Yoshiyama et al. | 315/241 P |
| 4,486,086 | 12/1984 | Kresock | 315/241 P |
| 4,486,691 | 12/1984 | Beggs | 315/241 P |
| 4,510,419 | 4/1985 | Takematsu | 315/241 P |
| 4,530,550 | 7/1985 | Kondo | 315/241 P |
| 4,656,397 | 4/1987 | Chappell et al. | 315/241 R |

FOREIGN PATENT DOCUMENTS

| | | | |
|---|---|---|---|
| F7673 | 3/1943 | Fed. Rep. of Germany | 315/241 P |
| 2446960 | 4/1976 | Fed. Rep. of Germany | 315/241 P |
| 0055930 | 5/1981 | Japan | 315/241 P |
| 0220322 | 11/1985 | Japan | 315/241 P |

OTHER PUBLICATIONS

"Glas- und Hochvakuumtechnik", (Glass and High--Vacuum Tech.) Aug. 1952.

*Primary Examiner*—James J. Groody
*Assistant Examiner*—Mark R. Powell
*Attorney, Agent, or Firm*—Foley & Lardner, Schwartz, Jeffery, Schwaab, Mack, Blumenthal & Evans

[57] ABSTRACT

The illumination device includes a charging part, an energy storage device, a flash tube and an amplitude control device, by means of which the energy storage device can be charged to different voltages. A time control device is superposed upon the amplitude control device. In consequence of the two control devices, the flash tube emits light with a predetermined color temperature as a function of the set amplitude and of the set flash duration. The color temperature can thereby be influenced in a controlled manner, with the maintenance of a very fine setting of the quantity of light, and can also be maintained constant independent of the quantity of light emitted.

11 Claims, 4 Drawing Sheets

FLASH APPARATUS WITH COLOR TEMPERATURE CONTROL

BACKGROUND OF THE INVENTION

The invention relates to an illumination device and flash equipment.

With the illumination device and flash equipment, it is possible for differing quantities of light to be emitted. The energy store of such devices comprises a plurality of flash capacitors. Depending upon the quantity of light to be emitted, the appropriate flash capacitors are actuated or deactuated. The flash capacitors which are in operation at any time are invariably charged to the same voltage, so that the color temperature of the flash which is produced remains constant, substantially independent of the selected energy. However, these devices have the disadvantage that the flash energy can be set only in relatively large steps, because the quantity of light can be altered only be actuating or deactuating flash capacitors. Such devices are not suitable for elaborate and highly accurate exposures.

In the case of the device of the type described, all flash capacitors which are provided in the energy store are invariably operated. However, depending upon the required energy, i.e., the quantity of light to be emitted, the electrolytic capacitors are charged to voltages of differing magnitudes by means of the amplitude control device. In the event that a large quantity of light is to be emitted, the flash capacitors are charged by means of the amplitude control device to a very high voltage value, while conversely, if only a small quantity of light is required, the capacitors are charged to a correspondingly low voltage value. In this manner, the quantity of light to be emitted in each instance can be set very accurately at the device. However, this device has the disadvantage that the color temperature of the light emitted by the flash tube varies as a function of the quantity of light, as a consequence of the differing voltages of the electrolytic capacitors. For this reason, the quantity of light cannot be varied in a manner selectable at will if attention must be paid to an accurate color temperature of the light to be emitted. The amplitude control device which may be used in the invention described therein is generally known.

SUMMARY OF THE INVENTION

The object of the invention is to construct the illumination device and flash equipment of the type described in such a manner that, with the maintenance of a very fine settng of the quantity of light, the color temperature of the light emitted by the flash tube can be influenced in a controlled manner and can preferably be maintained constant independent of the quantity of light emitted.

In the device according to the invention, the amplitude control device and the time control device act in combination in such a manner that, with the quantity of light emitted, the desired color temperature is obtained. If the flash energy is reduced, in that the energy store is charged to a low value, this results in a color shift in the direction of lower, i.e., warmer, color temperatures. In the device according to the invention, this color shift is counteracted by the time control device. By means of the latter, the flash duration is simultaneously shortened, whereby a color shift in the direction of higher, i.e., colder, color temperatures is produced. By appropriate selection of the charging voltage, i.e., of the amplitude and of the flash duration, it is thus possible for the desired color temperature to be set with a predetermined quantity of light. With the device according to the invention, it is thus possible, in a very simple manner, for example to maintain the color temperature constant by appropriate selection of the reduction and shortening within a large setting range. On this basis, it is possible to use the device according to the invention for the purpose of producing exposures which are distinguished by an optimal color temperature. However, with the device according to the invention not only can the color temperature be maintained constant within a large setting range, but the color temperature can also be set to a specified value.

In one embodiment, the current supply part, i.e., the generator part, and the lamp are combined in one component. The amplitude control device and the time control device are already incorporated in the latter, so that the user of this component has available a universal unit in which one can cope with all exposure situations.

However, it is also possible to separate the generator part from the lamp and to connect the two parts to one another by a scale. In this embodiment, the amplitude control device and the time control device can both be provided in the generator part or can both be provided in the lamp. However, the amplitude control device and the time control device can also selectively be accommodated in each instance in the generator part and in the lamp.

For devices which, in constructional terms, are divided into the generator part and the lamp, there is the possibility of accommodating the control deivces in an accessory part. Thus, the time control device can be provided in such an accessory part, which is then provided for devices which are equipped only with the amplitude control device. It is, of course, also possible to accommodate the amplitude control device in an accessory part, which is then used for devices which have only a time control device.

The time control device and the amplitude control device can also be provided in common in an accessory part, which is then used for devices which do not exhibit any control device.

Further features of the invention will become evident from the claims, the description and the drawings.

BRIEF DESCRIPTION OF THE DRAWINGS

The invention will be explained in greater detail with reference to two embodiments shown in the drawings. In the drawings.

DETAILED DESCRIPTION OF THE PREFERRED EMBODIMENTS

With the device, it is possible to influence, preferably to maintain constant, the color temperature of the flash equipment, the flash energy of which is preferably settable. In order to influence the quantity of light of an electronic flash equipment, the flash energy is varied. In the case of the device according to the invention, two processes are utilized in combination with one another for this purpose, so that the color temperature can be influenced in the desired manner or can also be maintained constant.

Figure 1:
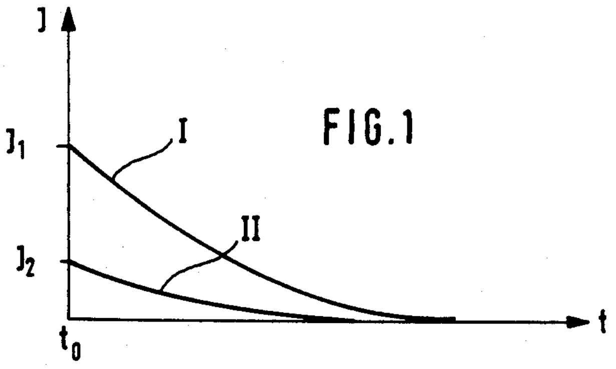
FIG. 1 shows the dependence of the discharge current of a device on variation of the voltage applied to the flash tube.

In FIG. 1, the current I is shown as a function of the time t, when the flash energy is varied by variation of the voltage applied to the flash tube (amplitude control device). The flash equipment exhibits at least one, preferably a plurality of energy stores, which are preferably electrolytic capacitors. All electrolytic capacitors, regardless of the selected power, are available for the operation of the flash equipment. The variation of the flash energy is achieved in that, depending upon the required energy, the electrolytic capacitors are charged to differing charge levels. FIG. 1 shows the case in which the electrolytic capacitors are charged to a high value I1 and to a low value I2. Starting from the firing time $t_0$, the voltage decreases with time. The area under the curve I or II respectively corresponds to the quantity of light which can be emitted by the flash equipment. The greater the extent to which the energy stores are charged, the greater is the quantity of light to be emitted. The quantity of light can thus be very finely set by variation of the charging voltage. However, the color temperature of the light of the flash varies as a consequence of the differing charging voltages, so that the range of variation cannot be increased to any extent selectable at will if great accuracy of color or precise color temperatures are important. With falling charging voltage, there is a falsification of the color in the direction of lower color temperatures, i.e., the light has a more or less intense red cast, depending on the selected fall in voltage. For this reason the charging voltage can be varied only to a limited extent.

It is also possible to vary the flash energy by connection of loss resistors in series in the discharge circuit. The voltage at the flash tube is also reduced by this means. Such an arrangement can be provided in the case of simple flash equipment.

Figure 2:
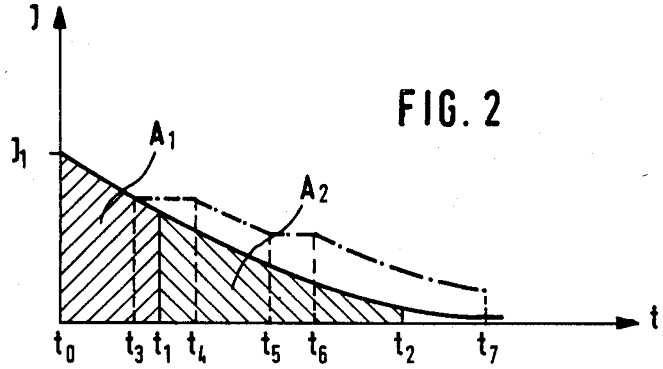
FIG. 2 shows the progression of the discharge current as a function of the time on variation of the flash energy by time-dependent deactuation of the flash discharge.

The flash energy can also be varied by restricting the flash duration. FIG. 2 shows the corresponding I-t diagram. All energy stores are charged to a specified level $I_1$. In this process, all energy stores are in operation, regardless of the selected voltage. The quantity of light to be emitted is varied in that the discharge is interrupted after a specified time $t_1$ after the firing time $t_0$. Depending upon the cut-off time t1, the quantity of light emitted is different. The quantity of light emitted corresponds to the area under the I-t curve up to the cut-off time t1. This area is identified by hatching in FIG. 2. The quantity of light to be emitted can also be very finely set with this process. In this case, the color temperature of the flash which is produced depends on the cut-off time. If the flash energy to be emitted is reduced, in that the cut-off time t1 is set to be very early, there is a falsification of the color of the flash which is produced in the direction of higher color temperatures, i.e., the flash has a more or less intense blue cast.

With reference to FIGS. 1 and 2, it has been explained that with both processes per se the flash energy to be emitted can be set very accurately, but that on variation of the charging voltage downwards the flash which is produced is shifted in the direction of lower color temperature, and on variation of the cut-off time in the direction of the starting time to, it is shifted to higher color temperatures. In relation to the color temperature of the flash which is produced, there are therefore two opposite effects. These two types of variation are now combined with one another by the device according to the invention. If the quantity of light to be emitted is to be reduced, then the charging voltage is reduced and at the same time the flash is also shortened in its length. Since on reduction of the charging voltage a shift in the direction of lower color temperatures takes place and on a shortening of the flash duration a shift in the direction of higher color temperatures takes place, the desired color temperature can be produced in this way by appropriate selection of the reduction of the charging voltage and of the shortening of the flash duration. It is therefore possible, for example, to maintain the color temperature constant within a large setting range, so that the color temperature is in all cases the same, regardless of the quantity of light emitted. It is likewise possible to shift the color temperature deliberately in the direction of lower or of higher color temperatures by controlled selection of the corresponding charging voltage and of the flash duration. Since the charging voltage and the flash duration can be set very sensitively, the desired color temperature can be set very accurately with the device. By simultaneous setting of the charging voltage and of the flash duration on the device, it is thus possible to set any desired color temperature under the most widely varying exposure conditions, within a specified range.

Figure 5:
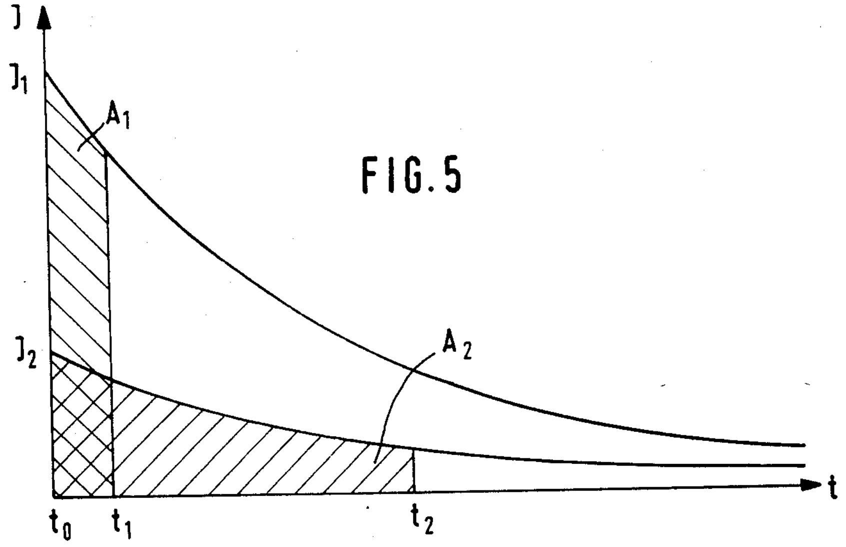
FIG. 5 shows the dependence of the deactuation time in a device according to the invention on variation of the voltage applied to the flash tube for the purpose of achieving a constant flash energy.

FIG. 5 shows two curves with differing charging voltage and flash duration. The areas A1 and A2 under the two curves contain the same energy content or quantity of light. In the case of curve I1, the color temperature is increased by increasing the charging voltage. The same effect takes place as a result of the early cut-off t1. Both factors influence the color in the direction of blue. In the case of curve I2, the color temperature is influenced in the direction of red by reducing the charging voltage and by later cut-off (t2). Undesired color shifts can be corrected with this device. There are several possibilities for predetermining the cut-off time t1: either to predetermine the time directly, or to select the magnitude of the current or the magnitude of the voltage. In all cases, the cut-off time can be set accurately.

By using the described device, a so-called asymmetric light distribtion in the case of a plurality of lamps connected to a generator is also possible. It is known to connect a plurality of lamps to a generator. In the case of appropriate exposure situations, for example, one of the flash lamps serves as the main light and the other lamps as subsidiary light. However, all lamps connected to the generator receive the same energy, so that the subsidiary light is too strong, as compared with the main light. If lamps or flash equipment which include the combined amplitude control device and time control device are employed for the subsidiary light, then the lamps forming the subsidiary light can be cut off by predetermining the cut-off time, before the entire charge of the energy stores has been dissipated. Accordingly, in the case of the lamp forming the main light, the entire charge of the energy stores is dissipated, while in the case of the other lamp(s), only a part of the charge is dissipated, that is to say that less light radiation is emitted. Thus, with a generator which is normally provided only for a symmetrical light output, i.e., in which all lamps connected to it emit the same quantity of light, it is possible to achieve a variable asymmetric light output by shifting the cut-off time.

By using the device, it is also possible, in exposure situations with a plurality of lamps or flash equipment, to fire the lamps forming the subsidiary light with a delay as compared with the main light. In order to maintain the color temperature constant, it is thus possible for the subsidiary light not only to be cut off prior to complete discharge, but also for the subsidiary light to be fixed later. A variable asymmetric light distribution is also possible in this manner. As a result of the later firing and the early cut-off, a part of the blue and red color components is removed from the flash, so that by selection of the firing time and of the cut-off time the color composition and thus the color temperature of the flash which is produced can be accurately controlled.

The color temperature can also be varied by selecting the cut-off time in such a manner that, with a predetermined charging voltage, the same quantity of light is produced (the areas A1 and A2 in FIG. 5 are equal).

In the case of the variant A1, the blue color component is predominant, while in the case of the variant A2, the red color component is predominant. By this means, the color temperature can be deliberately set, with an equal quantity of light in each instance. As is shown by FIG. 5, the flash duration for the quantity of light to be emitted A1 is, in this instance, substantially shorter than the flash duration which is required for the emission of the equally great quantity of light A2.

By means of this device, sequences of movement can be imaged with or without sharpness, in a selectable manner.

Photographic cameras which have a built-in sensor for computer flashguns are known. As soon as the computer flashgum has emitted a sufficient quantity of light, a signal is emitted as a function of the film speed set on the camera, for the purpose of cutting off the computer flashgun. This device provided on the camera can also be utilized for lamps or for flash equipment with the described combination control device. In this case, the unit is connected to the appropriate camera input. As soon as the unit has emitted a specified quantity of light, the cut-off signal is emitted by the camera, and the unit is cut off. The unit with the described combination control device is usually intended for studios, and has a power in the order of magnitude of, for example, 6000 Wsec. The conventional computer flashguns which are used on cameras have powers in the order of magnitude of approximately 100 Wsec. to a maximum of approximately 200 Wsec. Thus, the combination control device can be used both for flashguns of low power (so-called computer flashguns for amateurs and reporters) and also for studio flash equipment of high to very high power.

A further possible application of the lamp or of the flash equipment with the combination control device consists in producing a stroboscopic effect. This is to be explained with reference to FIG. 2. The flash tube is fired at time $t_0$. It is cut off at time $t_3$. At a freely definable time $t_4$, the flash tube is once again fired, and is again cut off after the time $t_5$. At time $t_6$ it is fired again, and at time $t_7$ it is cut off again. In this manner, the energy stores of the flash equipment can be discharged in stages. The cut-off times can be selected in such a manner that the smaller quantities of light which are emitted in each instance are precisely equal to one another. A stroboscopic effect can thus be produced in a simple manner (broken line in FIG. 2).

Since with flash equipment having a combination control device the charging part can charge independently of the flash unit, i.e., also during the flash process, it is possible to provide a subsequent supply of new energy permanently in the stroboscopic mode of operation. As a result of this, the energy store is less rapidly depleted in the stroboscopic mode of operation, and this permits a longer sequence of flashes.

It is evident from the described exemplary embodiments that the lamp or the flash equipment having the combination control device represents a universal device with which the most widely varying types of exposure problems can be solved in a simple manner.

Figure 3:
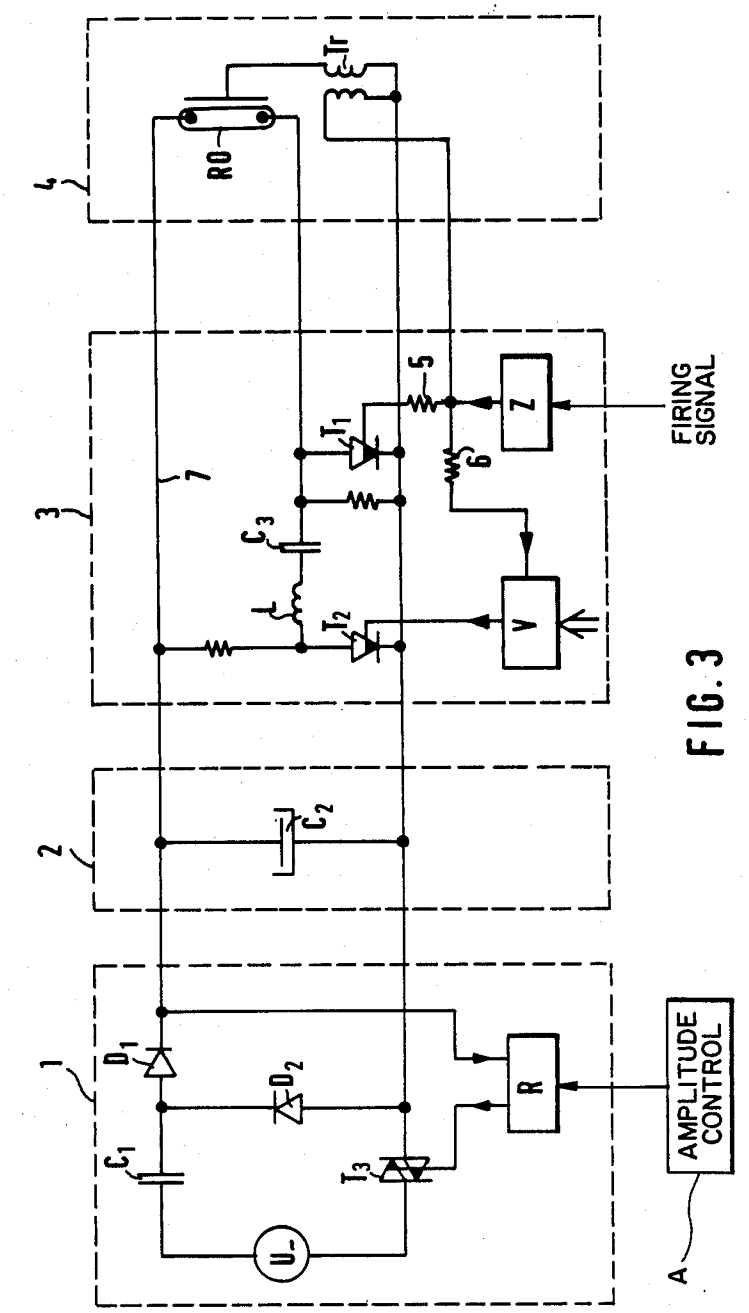
FIGS. 3 and 4 show respective embodiments of a circuit of the device according to the invention, for maintaining the color temperature constant.

FIG. 3 shows a circuit for maintaining the color temperature constant. This has a charging part 1 with an amplitude control device A. The device includes not only the charging part 1 but also an energy store 2, a time control device 3 and a flash unit 4. The charging part 1 has a power supply U, which supplies an alternating voltage and to which a capacitor C1 and a diode D1 are connected in series. Between the capacitor C1 and the diode D1 there is a second diode D2, which is situated between a switch T3 and the diode D1. The electronic switch T3 is, for example, a traic, by which the charging part 1 can be switched in and out. The capacitor C1 and the diodes D1 and D2 act as a voltage doubler.

The energy store 2 comprises at least one capacitor for storing the flash energy. Electrolytic capacitors are preferably used as the energy store. The energy store C2 is charged by the charging part 1. The switch T3 of the charging part 1 is actuated by a control circuit R. The control circuit R measures the instantaneous voltage at the capacitor C2 and activates the switch T3 as long as this is below a predetermined, settable value. The predetermined settable value may be set in either a manual or automatic manner. When the capacitor C2 has the desired voltage, the switch T3 is deactivated by the control circuit.

The time control device 3 has a delay circuit V, by which a switch T2, which is, for example, a thyristor, is actuated. The electrical switch T2 is fired at the cut-off time and generates a negative voltage peak at a further electrical switch T1, which is, for example, a thyristor. The electrical switch T1 is activated at the time of firing of the flash, and is blocked again at the cutoff time by application of a negative voltage peak by a capacitor C3. The cut-off time may be set by means of adjusting the delay of delay circuit V in accordance with the principles discussed above in relation to FIGS. 1, 2 and 5.

The time control device 3 also has a firing circuit Z, which at the time of triggering of the flash generates a voltage peak, which fires a flash tube RO via a firing transformer Tr. In addition to this, the firing circuit Z fires the electrical switch T1 via a limiting resistor 5. Furthermore, the delay circuit V is activated by the firing circuit Z via a further limiting resistor 6.

In order to limit the rise of the current in the switch T2, an inductor L, preferably a coil, is provided.

The energy store C2 is charged at all times by the charging part 1, so that the desired energy is available at the firing time. The control circuit R constantly measures the instantaneous voltage at the energy store C2, and activates the switch T3 when the measured voltage is below the settable value. At the instant of triggering of the flash, the firing circuit Z generates a voltage peak, which fires the flash tube RO via the firing transformer Tr. The firing transformer Tr generates a corresponding high-voltage pulse. At the same time, the switch T1 is fired via the firing circuit Z, and the delay circuit V is activated. The discharge current can flow from the capacitor C2 via the line 7 to the flash tube RO and from there via the closed which T1 to the capacitor C2. After a settable period of time, the delay circuit V activated by the firing circuit Z emits a signal for the interruption of the flash discharge to the switch T2. It is therefore fired at the cut-off time, and a negative voltage peak is generated via the inductor L and the cutoff capacitor C3 at the switch T1. Since the switch T2 is opened via the delay circuit V, the discharge current can flow back via the flash tube RO, the cut-off capacitor C3, the inductor L and the switch T2 to the energy store C2. By application of the negative voltage peak, the switch T1 is blocked again by the cut-off capacitor C3. If the cut-off capacitor C3 is charged to the instantaneous value of the flash voltage, the switch T2 is blocked and the flash discharge is thereby terminated.

Figure 4:
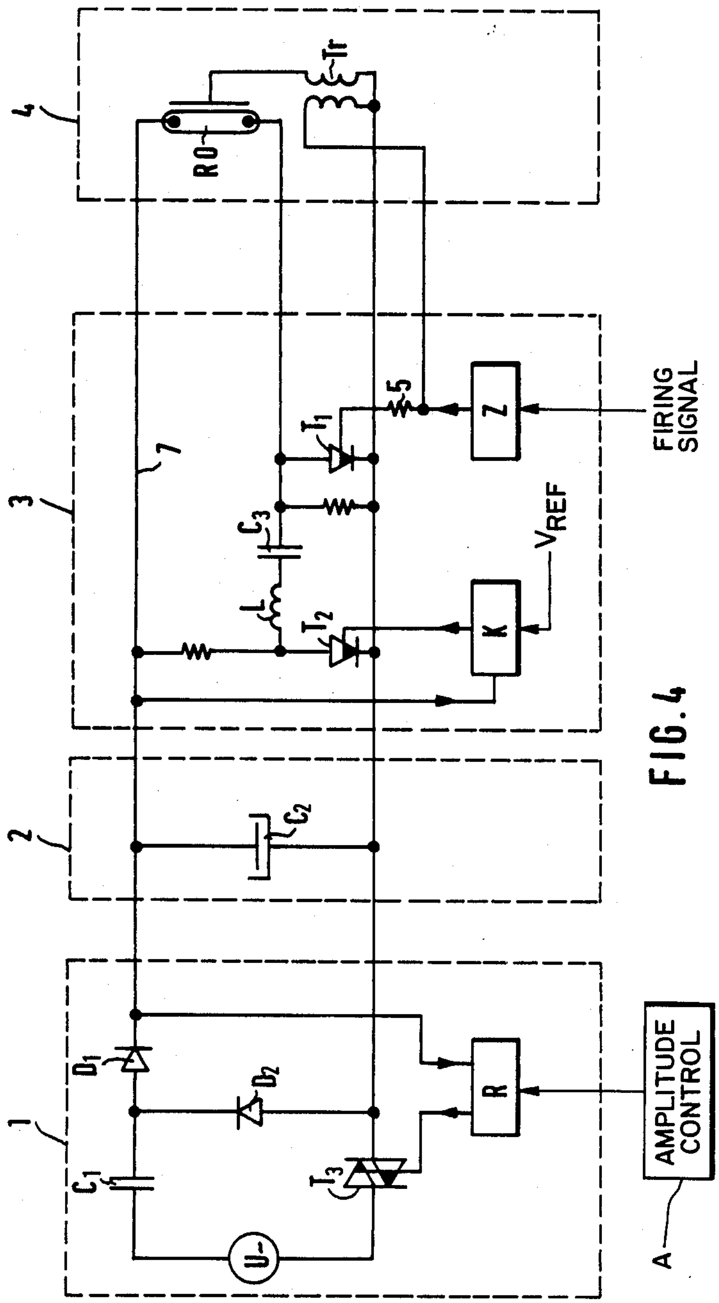

The flash equipment or the lamp according to FIG. 4 likewise has the charging part 1, the energy store 2, the time control device 3 and the flash unit 4. In this embodiment, the charging part 1, the energy store 2 and the flash unit 4 are constructed in the same manner as in the exemplary embodiment according to FIG. 3. In place of the delay circuit V according to FIG. 3, the time control device 3' comprises a comparator K, which monitors the instantaneous voltage at the energy store C2. As soon as this voltage falls below a set value ($V_{REF}$), the comparator K sends a cut-off signal to the switch T2 and blocks the latter. In other respects, this embodiment operates in the same way as the previously described exemplary embodiment. At the instant of triggering of the flash, the firing circuit Z generates a voltage peak, by which the flash tube RO is fired via the firing transformer Tr. In addition to this, the switch T1 is fired by the firing circuit Z via the limiting resistor 5. The discharge current can then flow from the energy store C2 via the line 7 to the flash tube RO and from there via the switch T1 back to the energy store C2. The comparator K compares the instantaneous voltage at the energy store C2 with a previously set input value. As soon as the value falls below this previously set input value, the comparator K generates a cutoff signal, which fires the switch T2. By this means, a negative voltage peak is generated via the inductor L and the cut-off capacitor C3 at the switch T1, whereby the switch is blocked. As soon as the cut-off capacitor C3 has been charged once again to the instantaneous value of the flash voltage, the switch T2 is blocked and thus the flash discharge is terminated.

The described lamps or flash equipment consist of the charging part 1, the energy store 2, the time control device 3 and the flash unit 4 with the flash tube RO. In addition, an amplitude control device A is provided (not shown in FIG. 3 and 4), which is known per se and by means of which, as has been explained with reference to FIG. 1, the energy store can be selectively charged to differing voltages.

In one exemplary embodiment, the charging part 1, the energy store 2, the time control device 3, the amplitude control device and the flash unit 4 are accommodated in a single unit, which is preferably constructed as a compact unit. All the possible variations explained in detail above, with the exception of the asymmetric power distribution, are thus open to the owner of such a compact unit.

In another embodiment, the flash unit 4 can be accommodated in a separate lamp, while the remaining components, namely the charging part 1, the energy store 2, the time control device 3 and the amplitude control device, can be accommodated in a generator part.

In a further embodiment, the time control device 3 and the amplitude control device are combined in the flash unit 4 and form part of the lamp. In this case, the charging part 1 and the energy store 2 are accommodated in the generator.

In another embodiment, the charging part 1, the energy store 2 and the time control device 3 or the amplitude control device are accommodated in the generator, while the flash unit 4 and the respective other part of the control device are provided in the lamp.

An embodiment is also possible in which the charging part 1, the energy store 2 and the time control device 3 or the amplitude control device are again accommodated in the generator. The respective other control device part, i.e., the amplitude control device or the time control device 3, is accommodated in an accessory unit. The flash unit 4 is then a separate component. In the case of this embodiment, the user can subsequently acquire the accessory part with the time control device or with the amplitude control device, and can thus upgrade his equipment.

Furthermore, it is possible to accommodate the time control device and the amplitude control device together in an accessory part. In these circumstances, the charging part 1 and the energy store 2 are accommodated in the generator, and the flash unit 4 is accommodated in the lamp.

Finally, an embodiment is also possible in which the charging part 1 and the energy store 2 are again accommodated in the generator. The time control device 3 or the amplitude control device can again be accommodated in an accessory part. The respective other control device part, which is not provided in the accessory part, is then situated in the lamp, which also contains the flash unit 4.

A further embodiment is possible in which a generator operated with a plurality of lamps is equipped with one or more time cut-off devices and controls the connected lamps independently of one another.

The operation of the control device for the amplitude and/or for the flash duration can take place both directly on the flash equipment (generator or the lamp thereof) and also in the form of a remote control device via a cable or an infrared, radio or ultrasonic pulse.

What is claimed is:

1. A method of controlling an illumination device comprising the steps of:

(a) charging an electrical energy storage device to one of a plurality of voltages;

(b) connecting said storage device to said illumination device for energizing said illumination device wherein said illumination device emits light;

(c) controlling a duration of time of energization of said illumination device;

(d) deenergizing said illumination device after a variable time duration; and (e) cooperatively controlling the voltage and time duration in order to produce a predetermined color temperature of said light emitted from said illumination device as a function of both the voltage and the time duration.

2. The method as recited in claim 1, wherein said controlling step (E) includes controlling said voltages for producing a constant color temperature of said light for various time durations.

3. The method as recited in claim 1, wherein said controlling step (E) includes controlling said time durations for producing a constant color temperature of said light for various voltages.

4. An ullumination device and flash equipment comprising:

(a) at least one energy storage device;
(b) a charging circuit connected to said energy storage device for charging said energy storage device to a set voltage;
(c) at least one flash tube; and
(d) a control means including:
(i) an amplitude control means for variably setting the set voltage of said energy storage device; and
(ii) time control means, having a variably set time duration, and cooperating with said amplitude control means for controlling the duration of light emitted from said flash tube such that the flash tube emits light with a predetermined color temperature as a function of the set voltage and the set time duration; and
(e) wherein said time control means includes a firing circuit for firing the flash tube, and a delay circuit means actuated by said firing circuit for terminating operation of said flash tube after said set time duration.

5. The device as claimed in claim 4, wherein in order to achieve a constant color temperature of light emitted by the flash tube with reduced energy of the emitted light, the set voltage of the energy storage device is reduced by means of the amplitude control means and the flash duration is shortened by means of the time control means.

6. The device as claimed in claim 4, wherein the time control means further includes a first switch actuatable by the firing circuit.

7. The device as claimed in claim 6, wherein said time control means further includes a cut-off capacitor for controlling the first switch.

8. The device as claimed in claim 6, wherein said first switch is a thyristor.

9. The device as claimed in claim 4, wherein said time control means further includes a second switch and wherein the delay circuit means controls said second switch.

10. The device as claimed in claim 4, wherein the time control means includes a comparator connected to the energy storage device, said comparator comparing the actual voltage of the energy storage device with a reference voltage and generating a cut-off signal for terminating operation of said flash tube as soon as the actual voltage falls below the reference voltage.

11. The device as claimed in claim 10, wherein said time control means includes a switch connected to the output of the comparator.

* * * * *